United States Patent Office 3,536,696
Patented Oct. 27, 1970

3,536,696
FERRIC HYDROXIDE DEXTRAN AND DEXTRIN HEPTONIC ACIDS
Ranulph Michael Alsop, Alderley Edge, Cheshire, England, and Ian Bremner, Cults, Aberdeen, Scotland, assignors to Fisons Pharmaceuticals Limited, Loughborough, England
No Drawing. Filed Oct. 16, 1967, Ser. No. 675,343
Claims priority, application Great Britain, Oct. 22, 1966, 47,466/66; Dec. 21, 1966, 57,323/66; Aug. 16 1967, 37,691/67
Int. Cl. C08b 25/02, 25/04
U.S. Cl. 260—209      7 Claims

ABSTRACT OF THE DISCLOSURE

The present invention is directed to ferric hydroxide complexes of dextran heptonic acid and dextrin heptonic acid which complexes are useful in treating iron deficiency anaemia.

---

The present invention is concerned with improved therapeutically useful ferric hydroxide-carbohydrate complexes and to their preparation.

Iron dextran has been known for approximately thirteen years, and its development for the intramuscular administration of iron represented a substantial advance over previously available methods for the administration of iron. Iron dextran possesses many advantageous properties including comparatively low toxicity, comparatively low incidence of side reactions, and good absorption of iron. However, iron dextran does suffer from the disadvantages that it is very difficult ot prepare therapeutic compositions containing more than 10% iron, some side reactions do occur, the intramuscular administration has to be carried out over an extended period to correct low haemoglobin levels, the intravenous toxicity is not as low as is optionally required, staining of the skin can occur, particularly where a faulty administration technique is employed, and absorption of iron may not be complete within a short period of days.

It has now been found that these disadvantages may be overcome with a new ferric hydroxide complex as hereinafter described.

Accordingly the present invention provides a complex of ferric hydroxide with at least one of the heptonic acids: dextran heptonic acid and dextrin heptonic acid. According to a preferred embodiment the invention supplies a complex of ferric hydroxide with dextran heptonic acid.

Dextran and dextrin are polymeric glucose derivatives; in the case of dextran the anhydroglucose units are linked predominantly by alpha-1:6 linkages, and to a lesser extent by alpha-1:4 or alpha-1:3 linkages; in the case dextrin the anhydroglucose units are linked predominantly by alpha-1:4 linkages and to a lesser extent by alpha-1:6 linkages. Dextran is formed inter alia by the controlled fermentation of sucrose with *Leuconostoc mesenteroides;* partially depolymerised dextran may be obtained inter alia by hydrolysis of native dextran, and fractions of different molecular weight may be obtained by solvent fractionation. Dextrin may be obtained by the hydrolysis of starch; fractions of different molecular weight may be obtained similarly by solvent fractionation.

Dextran heptonic acid and dextrin heptonic acid are chemically different from dextran and dextrin and are prepared by the reaction of dextran or dextrin with cyanide ions, forming the corresponding cyanoydrin, which may then be hydrolysed to the corresponding heptonic acid. By this reaction the aldehyde group on the terminal anhydroglucose unit of the dextran or dextrin is converted to a glycollic group as follows:

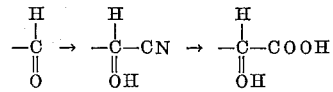

Consequently the heptonic acid can be in the form of stereoisomers, which can be shown in the terminal $C_7$ part of the molecule as follows:

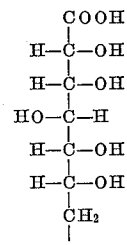

or

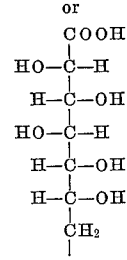

The terms dextran heptonic acid and dextrin heptonic acid used herein cover both stereoisomers.

The present invention also provides a process for the preparation of a ferric hydroxide complex with a heptonic acid selected from dextran heptonic acid and dextrin heptonic acid which comprises reacting together a suspension of ferric hydroxide and at least one of the compounds dextran heptonic acid and dextrin heptonic acid.

The dextran heptonic acid used and dextrin heptonic acid are desirably of low molecular weight, and suitably have an equivalent weight of 500 to 50,000 and preferably from 1,000 to 10,000. The dextran starting material is suitably partially depolymerised and fractionated to the appropriate molecular fraction; similarly the dextrin starting material is fractionated to the appropriate molecular fraction. The dextran heptonic acid and dextrin heptonic acid are suitably prepared by the reaction of dextran or dextrin of the appropriate molecular fraction, suitably having an equivalent weight of 500 to 50,000 with cyanide ions in solution. The reaction is suitably effected with an alkali metal cyanide; it may also be carried out with hydrogen cyanide and ammonia. The reaction is preferably carried out in an aqueous medium; it may however be carried out in the medium of a highly polar organic solvent such as pyridine or dimethyl formamide. The reactoin with cyanide is suitably carried out at a pH in the range 7–11, and preferably at about pH 9. The reaction may be carried out at various temperatures, suitably in the range 20–50°C.; the rate of reaction is increased with temperature, but at temperatures much in excess of 50° C. hydrolysis of the cyanide reactant takes place. When the formation of the cyanhydrin is complete or substantially complete, the cyanhydrin may be hydrolyzed, suitably by heating the solution, for example to 90–100° C. The hydrolysis is assisted by the passage of gas, for example air or nitrogen, through the solution to assist in the removal of the ammonia formed in the hydrolysis step. If desired the cyanhydrin product could be separated before the hydrolysis step; however this is not necessary, and the reaction product may be subjected to the hydrolysis step. The hydrolysis may be assisted if excess cyanide is removed from the reaction mixture before the hydrolysis step, for example by ion exchange. The product of the hydrolysis step is the heptonic acid which may be separated from the reaction mixture, if desired, for example by alcohol precipitation. However, it is not necessary for the heptonic acid to be separated, and the hydrolysis product may be used in the formation of the ferric hydroxide complex.

The suspension of ferric hydroxide is suitably a colloidal suspension and may be performed or formed in situ or both. The reaction may be carried out in various ways, but desirably the last stage of the reaction is effected at a pH between 5 and 7, preferably about 6, and the product is subjected to heating, for example to a temperature greater than 50° C. If desired an intermediate complex of ferric hydroxide with the heptonic acid may be precipitated, for example by the addition of alcohol, and the precipitate thereafter subjected to this heating step at a temperature greater than 50° C. at a pH of between 5 and 7.

The colloidal ferric hydroxide is generally prepared by a double decomposition reaction between a ferric salt and an alkali. Suitable ferric salts include ferric chloride, ferric nitrate, ferric perchlorate, ferric trichloroacetate, ferric ammonium acetate, ferric citrate, ferric ammonium citrate and ferric oxy salts. Suitable alkalis include sodium hydroxide, sodium carbonate, potassium hydroxide, potassium carbonate, ammonium hydroxide, ammonium carbonate etc.

Alternatively, the ferric hydroxide may be prepared by treatment of the ferric salt with an anion exchange resin, which resin may be strongly or weakly basic. A further process for the preparation of ferric hydroxide from a ferric salt is by dialysis against an aqueous solution containing an alkali or by electrodialysis (electrometathesis).

A preferred process for the complexing of the heptonic acid with ferric hydroxide includes partial preforming of the colloidal ferric hydroxide by slow partial neutralization of the ferric salt with the alkali before reaction with the heptonic acid and subsequent completion of the formation of the ferric hydroxide in the presence of the heptonic acid, the slow neutralization taking place over at least 30 minutes. This first part of the process for the formation of the complex suitably takes place without heating, for example at a temperature of about 30° C. The partially formed complex may then be heated in solution to complete the reaction, suitably after adjustment of the pH to the range 5–7.

Where the complex is prepared using partial or complete formation of the ferric hydroxide in situ in the presence of the heptonic acid, the resultant aqueous solution of the complex will also contain a "salt" comprising the anion of the ferric salt and the cation of the alkali, except, of course, where the ferric hydroxide is prepared by the electrodialysis or ion exchange processes.

The complex may be freed from this impurity either by subjecting the solution to dialysis or by precipitating the complex by the addition of a suitable water-miscible solvent such as methyl or ethyl alcohol and subsequently redissolving the complex in distilled water.

The complex of ferric hydroxide with the heptonic acid according to the present invention can be separated as a solid. For therapeutic use this is required as a solution, and therapeutically useful solutions may be obtained directly from the aqueous reaction product or by dissolving the separated solid complex.

The complex of ferric hydroxide with the heptonic acid according to the present invention forms a stable mobile solution suitable for parenteral administration. The complex is of extremely low intravenous toxicity, and may readily be obtained with a high content of iron suitable for parenteral administration. The intravenous toxicity ($LD_{50}$) is generally greater than about 4,000 mg. Fe per kg. body weight. It is possible to obtain without difficulty ferric hydroxide-heptonic acid complexes according to the present invention containing up to 43% by weight of elemental iron, and preferably containing 38–42% by weight of elemental iron. Similarly it is possible to obtain injectable compositions of the complex of ferric hydroxide with the heptonic acid according to the present invention containing up to 250 mg. of elemental iron per ml. of solution, and preferably containing 50–200 mg. of elemental iron per ml. of solution.

On account of the extremely low intravenous toxicity of the product, and the high iron concentrations obtainable, it is possible using the product of the invention to administer a patient's total requirement of iron in a single intravenous injection. This is a very substantial advance and obviates the need for repeated intramuscular injections. Thus, for example, a single 10 ml. injection containing 2 grams of iron (Fe) of the ferric hydroxide-dextran heptonic acid complex according to the present invention may be administered as an intravenous injection over a period of a few minutes. By way of contrast, if 2 grams of iron are to be administered by intramuscular injection of iron dextran as the standard 5% solution, no less than 20 injections would be required with each injection being separated by at least 24 hours. In addition to being used intravenously, the products of the invention may also be used by intramuscular injection. The products of the invention are suitable for the treatment or prevention of iron deficiency anaemia in both man and animals. For veterinary use, the product will generally be administered by intramuscular injection, and the high concentrations of iron represent a substantial advantage, as the volume of the injection is correspondingly smaller. With the small volume required, it is possible to use multiple dose injection guns for the injection of numbers of animals, such as pigs.

The present invention is also for a pharmaceutical (including veterinary) composition containing the ferric hydroxide heptonic acid complexes according to the present invention. Such compositions suitably contain conventional components such as carriers; such compositions may also contain other pharmaceutically active components, such as vitamin $B_{12}$ and/or folic acid.

The pharmaceutical compositions for injection generally should have an average intrinsic viscosity in the range 0.025 to 0.25, and preferably 0.05 to 0.07, at 25° C. The viscosity of the preparation is related inter alia to the concentration of the complex in the solution and the molecular weight of the heptonic acid used in the preparation of the complex. In general the lower the molecular weight of the heptonic acid starting material the lower the viscosity of the product. The variables, molecular weight of the starting material and concentration, may be adjusted to produce a product of any desired viscosity. By proceeding in accordance with the present invention preparations containing in excess of 20% iron of a viscosity suitable for injection may be prepared.

The ferric hydroxide heptonic acid complexes according to the present invention are stable in storage and to sterilization by autoclaving.

The following examples are given to illustrate the present invention.

EXAMPLE 1

10 grams of potassium cyanide were added to a solution of 200 grams of low molecular weight dextran (having an average molecular weight of about 5,000) in 1,500 ml. of water. The reaction mixture was left overnight at 40° C. and then the temperature of the mixture was raised to 90–100° C. to hydrolyze the cyanhydrin and excess potassium cyanide; air was passed through the solution to assist removal of ammonia. The pH of the solution was then adjusted to pH 7.0 by the addition of hydrochloric acid and the solution concentrated by evaporation. The liquid concentrate was an aqueous solution of dextran heptonic acid which could, if desired, be precipitated by the addition of ethyl alcohol.

A solution of 36 grams of sodium carbonate in 150 ml. of water was added slowly over a period of 2 hours, to a solution of 75 grams of ferric chloride hexahydrate in 160 ml. of water, at a temperature of 30° C. A solution of 16 grams of dextran heptonic acid prepared as described above in 100 ml. of water was then added over a period of 15 minutes and the pH of the solution adjusted to pH 4.3 by the careful addition of 16% aqueous sodium carbonate solution.

The ferric hydroxide dextran heptonic acid complex was precipitated by the addition of ethanol and the precipitate was washed twice with 60% aqueous ethanol. The precipitate was redissolved in 100 ml. of water, the solution heated to a temperature of 70–80° C. and the pH of the solution adjusted to 6.0 by the addition of 10% aqueous sodium hydroxide solution. The last traces of alcohol were boiled off and the solution was then autoclaved at 10 p.s.i. for 30 minutes. The solution was then concentrated to 100 ml., filtered and the filtrate autoclaved at 10 p.s.i. for 30 minutes.

The solution had an elemental iron content of 153 mg. Fe/ml. and demonstrated an $LD_{50}$, on intravenous administration to mice, of greater than 3,800 mg. Fe per kg. body weight.

On injection into the hind leg of a rabbit at a dosage of 40 mg. Fe/kg. body weight an average of 14% of iron was retained at the injection site seven days after injection.

EXAMPLE 2

A solution of 7.2 kg. of anhydrous sodium carbonate in 24 liters of water was added slowly, over a period of 2 hours, to 16.8 liters of liquor ferriperchloride (containing 20% w./v. elemental iron) which had been previously diluted to 32 liters. 3.75 kg. of dextran heptonic acid (average molecular weight 5,000) in 14 liters of aqueous solution was then added while maintaining the temperature at 30 to 40° C. On completion of this addition and maintaining the temperature above 30° C. a further quantity of 16% w./v. sodium carbonate was added slowly to bring the pH to 6.0. The solution was heated to 90° C. for 2 hours and then the volume was reduced to about 20 liters by heating in vacuo at 55° C.

Salt was removed by dialysis against distilled water and the volume was again reduced to about 20 liters (i.e. to a concentration of 15% ferric hydroxide dextran heptonic acid complex). The salt concentration was adjusted to 0.9% w./v. and phenol was added to a concentration of 0.5%. Particulate matter was removed by passing the solution through a No. 3 sintered glass filter and after being sealed into ampoules the solution was autoclaved at 15 lb./sq. in. for 1 hour.

The autoclaved solution had an iron content of 153.2 mg. Fe/ml. and demonstrated an $LD_{50}$ on intravenous administration to mice of 4,600 mg. Fe/kg. body weight. The viscosity of the solution was 16.8 centistokes at 25° C. and the pH was 6.50.

On injection into the hind leg of a rabbit at a dosage of 40 mg. Fe/kg. body weight an average of 15% of iron was retained at the injection site seven days after injection.

EXAMPLE 3

A solution of 360 grams of anhydrous sodium carbonate in 1.2 liters of water was added slowly with vigorous stirring to 840 ml. of liquor ferriperchloride containing 20% w./v. elemental iron which had been previously diluted to 1.6 liters. 187.5 grams dextran heptonic acid (average molecular weight 5,000) in 700 ml. of water was then added while maintaining the temperature above 30° C. Still maintaining the temperature between 30° C. and 40° C. a further quantity of 16% sodium carbonate solution was added to bring the pH to 4.3. Ethyl alcohol was added to a concentration of 60% and the precipitated complex was filtered off and washed three times with 60% alcohol. The precipitate was redissolved in water and heated to 75° C. to remove alhocol. The pH was adjusted to 6.0 with 2.5 N sodium hydroxide and the solution was heated to 90° C. for 2 hours. The volume was reduced to about 1 liter (15% iron) and the solution was filtered, filled into ampoules and sterilized by autoclaving at 15 lb./sq. in. for 1 hour.

The autoclaved solution of ferric hydroxide dextran heptonic acid complex had an iron content of 158.3 mg. Fe/ml. and demonstrated an $LD_{50}$ on intravenous administration to mice in excess of 4,000 mg. Fe/kg. body weight.

On injection into the hind leg of a rabbit at a dosage of 40 mg. Fe/kg. body weight an average of 14% of the iron was retained at the injection site seven days after injection.

EXAMPLE 4

The procedure of Example 3 was followed with the modification that the weight ratio of iron to carbohydrate in the starting materials was adjusted to 1:0.75. The final solution was concentrated to a volume containing approximately 20% w./v. of elemental iron prior to the ultimate ampouling and sterilization steps.

The autoclaved solution of ferric hydroxide dextran heptonic acid complex had an iron content of 186.0 mg. Fe/ml. and demonstrated an $LD_{50}$ on intravenous administration to mice of greater than 4,700 mg. Fe/kg. body weight. The viscosity of the solution was 29.7 centistokes at 25° C. and the pH was 5.6.

On injection into the hind leg of a rabbit at a dosage of 40 mg. Fe/kg. body weight an average of 17.0% of iron was retained at the injection site seven days after injection.

EXAMPLE 5

840 ml. of liquor ferriperchloride (containing 20% w./v. elemental iron) was diluted to 1.6 liters and added to 900 ml. of a 20% w./v. aqueous solution of dextran heptonic acid (average molecular weight 5,000). The combined solutions were repeatedly passed through a column of an anion exchange resin (De-Acidite FF) until the pH of the eluate was 6.0. The column was regenerated after each pass by first washing with 1 N hydrochloric acid to remove residual traces of iron, followed by 1 N sodium hydroxide and then distilled water.

The eluate was heated to 90° C. for 2 hours and then dialyzed against distilled water to remove residual chloride and the volume was then reduced to 1.0 liter by rotary evaporation in vacuo. After filtration through a No. 3 sintered glass funnel the solution of the ferric hydroxide dextran heptonic acid complex was filled into ampoules and autoclaved at 10 lbs. per sq. in. for 30 minutes.

EXAMPLE 6

84 ml. of liquor ferriperchloride (containing 20% w./v. elemental iron) was diluted to 160 ml. with water and added to 19.0 gm. of dextran heptonic acid (average molecular weight 5,000) in 70 ml. of aqueous solution. The combined solution was dialyzed against 10 liters of distilled water containing 100 ml. of 0.880 ammonia for a period of 24 hours. The ammonia dialysis solution was replaced with a further 10 liters of distilled water and 50 ml. of 0.880 ammonia and dialysis was continued for a further 24 hours by which time the iron solution in the dialysis sac had been neutralized to pH 8.0. The ammonia dialysis solution was replaced by distilled water and dialysis for a further 24 hours reduced the pH to 6.5.

The solution of the ferric hydroxide dextran heptonic acid complex was heated in an autoclave at 15 lbs./sq. in. for 2 hours, reduced to 100 ml. volume, filtered, ampouled and sterilized for 1 hour at 15 lbs./sq. in.

This autoclaved solution contained 117 mg. Fe/ml.; the viscosity of the solution was 6.6 centistokes at 25° C. and the pH was 6.2. On injection into the hind leg of a rabbit at a dosage of 40 mg. Fe/kg. body weight an average of 12.5% of iron was retained at the injection site seven days after injection.

EXAMPLE 7

10 grams of potassium cyanide are added to a solution of 200 grams of low molecular weight dextrin (having an average molecular weight of about 5,000) in 1.5 liters of water. The reaction mixture is allowed to stand overnight at 40° C. and the temperature is then raised to 90–100° C. and the solution aerated to hydrolyze the cyanhydrin and excess potassium cyanide. The pH of the solution is then adjusted to pH 7.0 by the addition of hydrochloric acid and the solution concentrated by evaporation. The liquid concentrate was an aqueous solution of dextrin heptonic acid, which could, if desired, be precipitated by the addition of ethanol.

A solution of 24 grams of sodium carbonate in 100 ml. of water is added slowly over a period of 20 minutes, with stirring, to a solution of 46.4 grams of ferric chloride hexahydrate in 160 ml. of water. Then a solution of 24 grams of dextrin heptonic acid prepared as described above in 100 ml. of water is added over a period of 15 minutes and the mixture brought to pH 4.3 by the addition of 16% aqueous sodium carbonate solution. The reaction mixture is maintained at a temperature of 30° C. throughout.

The resultant ferric hydroxide dextrin heptonic acid complex is then precipitated by the addition of ethanol and the precipitate washed three times with 60% aqueous ethanol. The precipitate is then redissolved in 100 ml. of water.

The resultant solution is then heated to a temperature in the range of 70–80° C. and the pH of the solution adjusted to pH 6.0 by the addition of 10% aqueous sodium hydroxide solution. The solution is then maintained at a temperature of 90° C. for a period of 2.25 hours with the pH of the solution being kept at 6.0 throughout this period.

The solution is then filtered, the volume adjusted to 95 ml. and finally the solution is autoclaved at 10 p.s.i.g. for 30 minutes to yield a final solution containing about 100 mg. Fe/ml.

EXAMPLE 8

Nine day old piglets were each given an intramuscular injection of a 15% ferric hydroxide dextran heptonic acid complex prepared as in Example 2 containing 200 mg. of elementary iron. Blood samples were taken every seven days thereafter and the piglets were weighed at regular intervals.

A group of control animals were similarly studied, these animals receiving exactly the same treatment as the experimental animals with regard to diet, husbandry etc., but not receiving the ferric hydroxide dextran heptonic acid complex injection.

The average weight of the animals at the start of the experiment was 1.6 kg. and the haemoglobin level of the blood was 7.1 gms./100 ml. After six weeks the treated animals had an average weight of 8.9 kg. and a haemoglobin level of 10.5 gm./100 ml. blood, whereas the untreated animals had an average weight of 6.8 kg. and a haemoglobin level of 7.7 gms./100 ml. blood.

EXAMPLE 9

Two adult female patients suffering from hypochromic anaemia were each given a single intravenous injection of ferric hydroxide dextran heptonic acid complex prepared as in Example 4 containing 2 grams of Fe in 10 milliters. Both patients showed a satisfactory rise in blood haemoglobin with a complete absence of side effects.

EXAMPLE 10

A solution of 2.88 kgm. of anhydous sodium carbonate in 9 liters of water was added lowly over a period of two hours to 6.72 liters of liquor ferriperchloride (containing 20% w./v. elemental iron) which had previously been diluted to 24 liters.

1.39 kgm. of dextran heptonic acid (average molecular weight 5,000) in 7 liters of aqueous solution was then added while maintaining the temperature at 30–40° C. On completing this addition, and maintaining the temperature above 30° C., 16% w./v. sodium carbonate was added slowly to bring the pH to 5.0.

Salt was removed by electrodialysis and the pH adjusted to 6.0 by the addition of 10% sodium hydroxide. The resulting solution was heated in an autoclave at 15 lbs./sq. in. for one hour, and the volume then reduced to about 4.5 liters in a rotary evaporator. Particulate matter was removed by passing the solution through a No. 3 sintered glass filter and, after being sealed into ampoules, the solution was autoclaved at 10 lbs./sq. in for 30 minutes.

The autoclaved solution of ferric hydroxide dextran heptonate complex had an iron content of 223 mgm./ml.

We claim:

1. A complex of ferric hydroxide with a member of the group consisting of dextran heptonic acid and dextrin heptonic acid.

2. A complex of ferric hydroxide with dextran heptonic acid.

3. A complex of ferric hydroxide with dextrin heptonic acid.

4. A complex as claimed in claim 1 in which the heptonic acid has an average molecular weight of 500–50,000.

5. A complex as claimed in claim 1 in which the heptonic acid has an average molecular weight of 1000–10,000.

6. A complex as claimed in claim 1 which contains up to 43% by weight of elemental iron.

7. A complex as claimed in claim 1 which contains 38–42% by weight of elemental iron.

References Cited

UNITED STATES PATENTS

| 2,853,495 | 9/1958 | Ruskin et al. | 260—209 |
| 2,885,393 | 5/1959 | Herb. | |
| 3,022,221 | 2/1962 | Floramo. | |
| 3,070,506 | 12/1962 | Linkenheimer et al. | 260—209 |
| 3,076,798 | 2/1963 | Mueller et al. | 260—209 |

LEWIS GOTTS, Primary Examiner.

J. R. BROWN, Assistant Examiner.

U.S. Cl. X.R.

424—180, 361

PO-1050
(5/69)

UNITED STATES PATENT OFFICE
CERTIFICATE OF CORRECTION

Patent No. __3,536,696__  Dated __October 27, 1970__

Inventor(s) __Ranulph Michael Alsop and Ian Bremner__

It is certified that error appears in the above-identified patent and that said Letters Patent are hereby corrected as shown below:

Col 1, line 56, after "case" insert --of--; Col 2, line 4, change
"C " in both occurences to --C --; Col 3, line 11, change
$\overset{\parallel}{\text{OH}}$ to $\overset{|}{\text{OH}}$
"performed" to --preformed--; Col 5, line 75, change "alhocol" to --alcohol--

SIGNED AND
SEALED
DEC 22 1970

(SEAL)
Attest:

Edward M. Fletcher, Jr.
Attesting Officer

WILLIAM E. SCHUYLER, JR.
Commissioner of Patents